United States Patent
Qian

(10) Patent No.: US 12,455,027 B2
(45) Date of Patent: Oct. 28, 2025

(54) MULTI-LAYER COMPOSITE WATER PIPE AND MANUFACTURING METHOD THEREOF

(71) Applicant: Ningbo Aeon Plastics Co., Ltd, Zhejiang (CN)

(72) Inventor: Jiuqiang Qian, Zhejiang (CN)

( * ) Notice: Subject to any disclaimer, the term of this patent is extended or adjusted under 35 U.S.C. 154(b) by 22 days.

(21) Appl. No.: 18/433,405

(22) Filed: Feb. 6, 2024

(65) Prior Publication Data
US 2025/0251062 A1  Aug. 7, 2025

(51) Int. Cl.
| | |
|---|---|
| F16L 25/00 | (2006.01) |
| F16L 11/08 | (2006.01) |
| F16L 11/12 | (2006.01) |
| F16L 11/15 | (2006.01) |

(52) U.S. Cl.
CPC ......... F16L 25/0036 (2013.01); F16L 11/085 (2013.01); F16L 11/12 (2013.01); F16L 11/15 (2013.01)

(58) Field of Classification Search
CPC .......... F16L 11/12; F16L 11/085; F16L 11/15; F16L 11/081; F16L 25/0036; F16L 25/0045; F16L 25/0054; F16L 33/01
See application file for complete search history.

(56) References Cited

U.S. PATENT DOCUMENTS

| | | | | |
|---|---|---|---|---|
| 5,275,208 A * | 1/1994 | Lawrence | ................ | F16L 33/01 |
| 5,413,147 A * | 5/1995 | Moreiras | ............. | F16L 25/0036 |
| 9,765,909 B2 * | 9/2017 | Ashcroft | ................ | F16L 11/12 |
| 10,330,226 B1 * | 6/2019 | Ashcroft | ................ | F16L 33/01 |
| 2004/0112454 A1 * | 6/2004 | Takagi | ............ | F16L 11/15 |
| 2008/0245434 A1 * | 10/2008 | Hibino | .................... | F16L 11/15 |
| 2013/0087205 A1 * | 4/2013 | Berardi | ................... | F16L 11/12 |
| 2013/0192708 A1 * | 8/2013 | Strunk | ................ | F16L 11/085 |
| 2014/0230945 A1 * | 8/2014 | Ragner | | |
| 2015/0354731 A1 * | 12/2015 | Ragner | ................... | F16L 11/12 |
| 2018/0017200 A1 * | 1/2018 | Keough | ............... | F16L 11/085 |

FOREIGN PATENT DOCUMENTS

| | | |
|---|---|---|
| DE | 19512033 A1 * | 10/1996 |
| DE | 202015100073 U1 * | 3/2015 ............ F16L 11/12 |

OTHER PUBLICATIONS

DE-19512033-A1—Machine Translation—English (Year: 1996).*
DE-202015100073-U1—Machine Translation—English (Year: 2015).*

* cited by examiner

*Primary Examiner* — William S. Choi
(74) *Attorney, Agent, or Firm* — Hawaii Patent Services; Nathaniel K. Fedde; Kenton N. Fedde

(57) ABSTRACT

A multi-layer composite water pipe comprises a pipe body having equally spaced corrugations defining that the pipe body comprises at least one of a compressed configuration and an extended configuration, and the pipe body is variable in length between the compressed configuration and the extended configuration; an outer side of the pipe body is provided with a first tubular element, the first tubular element is made of an elastic material, the outer side of the first tubular element is provided with an extensible braided layer made of a fabric material, and the outer side of the braided layer is provided with a second tubular element made of an elastic material; the first tubular element, the braided layer and the second tubular element are each extendable or compressible in the direction of the change in length of the pipe body.

15 Claims, 16 Drawing Sheets

MULTI-LAYER COMPOSITE WATER PIPE AND MANUFACTURING METHOD THEREOF

TECHNICAL FIELD

The present invention relates to the technical field of water pipes, and in particular to a multi-layer composite water pipe and a manufacturing method thereof.

BACKGROUND

In modern industrial production, the design and use of piping systems is critical. Various types of pipes have been developed in order to meet the demands of various complex applications. Among them, bellows are widely used in various industrial fields due to their unique structure and properties.

Conventional water pipe structures are single and have poor scratch resistance, and they are easily scratched when used in rough environments, resulting in damage to the hose. Secondly, conventional hoses are prone to breakage due to the nature of the material. Such breakage is usually due to prolonged use, or due to excessive pressure inside the pipe. When a hose breaks, it will not function properly, affecting the operation of the entire piping system. As a result, conventional hoses require periodic inspection and replacement to prevent sudden pipe failures.

U.S. Pat. No. 10,563,796 discloses an extensible hose having a protective sheath of curled fabric, but which tends to absorb a lot of soil during use and is not easy to clean. A patent document published as CN213064955U discloses a rubber hose strong in scratch resistance, a protective layer, a waterproof layer, a tensile layer, an elastic layer and an anticorrosive layer are provided in the inside of a body, so that the rubber hose has a function of preventing corrosion and the like, avoiding breakage of the rubber hose under long-time use, its structure is complicated, and its production cost is high.

Based on this, it is necessary to provide an entirely new water pipe having strong strength characteristics and good pressure resistance, capable of adapting to various complicated environments, and also having good wear resistance, which effectively extends the service life of the water pipe.

SUMMARY

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various embodiments of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

The present invention provides a multi-layer composite water pipe including a pipe body, wherein the pipe body has equally spaced extensible corrugations defining that the pipe body includes at least one compressed configuration and at least one extended configuration; the pipe body is variable in length between the compressed configuration and the extended configuration; and wherein an outer side of the pipe body is provided with a first tubular element made of an elastic material; and
an outer side of the first tubular element is provided with an extensible braided layer made of a fabric material, and the braided layer includes at least two braided cord sets; the braided cord set includes at least two braided cords distributed in parallel, and the two braided cord sets are cross-wound on the first tubular element to form a continuous diamond-shaped mesh structure; and
an outer side of the braided layer is provided with a second tubular element made of an elastic material, and the first tubular element, the braided layer and the second tubular element are all extendable or compressible in a change direction of a length of the pipe body.

The present invention further provides a multi-layer composite water pipe including a pipe body, wherein the pipe body is made of a plastics material; the pipe body has equally spaced extensible corrugations defining that the pipe body includes at least one compressed configuration and at least one extended configuration; the pipe body is variable in length between the compressed configuration and the extended configuration; and wherein an outer side of the pipe body is provided with a first tubular element made of an elastic material; and
an outer side of the first tubular element is provided with an extensible braided layer, the braided layer is made of a fabric material, and the braided layer includes at least two braided cord sets; the braided cord sets include at least two braided cords, the braided cords are distributed in parallel, and the two braided cord sets are cross-wound on the first tubular element to form a continuous diamond-shaped mesh structure; and
an outer side of the braided layer is provided with a second tubular element made of an elastic material, and the first tubular element, the braided layer and the second tubular element are all extendable or compressible in a direction of a change in length of the pipe body; and
wherein the pipe body includes an input end and an output end, the input end has an adapter detachably connected thereto, the adapter has a sealing sleeve thereon, and the input end forms a detachable connection with the adapter through the sealing sleeve.

The present invention also provides a process for manufacturing a multi-layer composite water pipe, including the following steps of:

preparing a material for making a pipe body and a first extruder; preparing a material for a first tubular element and a second extruder; preparing a fabric material and a knitting machine for making a braided layer; preparing a material for making a second tubular element and a third extruder; sequentially arranging the first extruder, the second extruder, the braiding machine, and the third extruder; and preparing an adapter and a fastening device; and starting the machine, introducing a pipe body extruded by the first extruder into the second extruder, the second extruder extruding a first tubular element covering the pipe body outside the pipe body; introducing the pipe body and the first tubular element into the braiding machine, braiding a braided layer covering the first tubular element outside the first tubular element, the third extruder extruding the second tubular element covering the pipe body outside the braided layer; forming a continuous water pipe; and cutting the continuous water pipe to a desired length; and connecting the adapter to both ends of the cut water pipe, and fitting the fastening device at a joint of the adapter and the water pipe.

BRIEF DESCRIPTION OF DRAWINGS

In order to explain the technical scheme of this application more clearly, the drawings needed in the implementation will be briefly introduced below. Obviously, the drawings described below are only some implementations of this application. For those skilled in the art, other drawings can be obtained according to these drawings without creative work.

In the figures.

Figure 1:
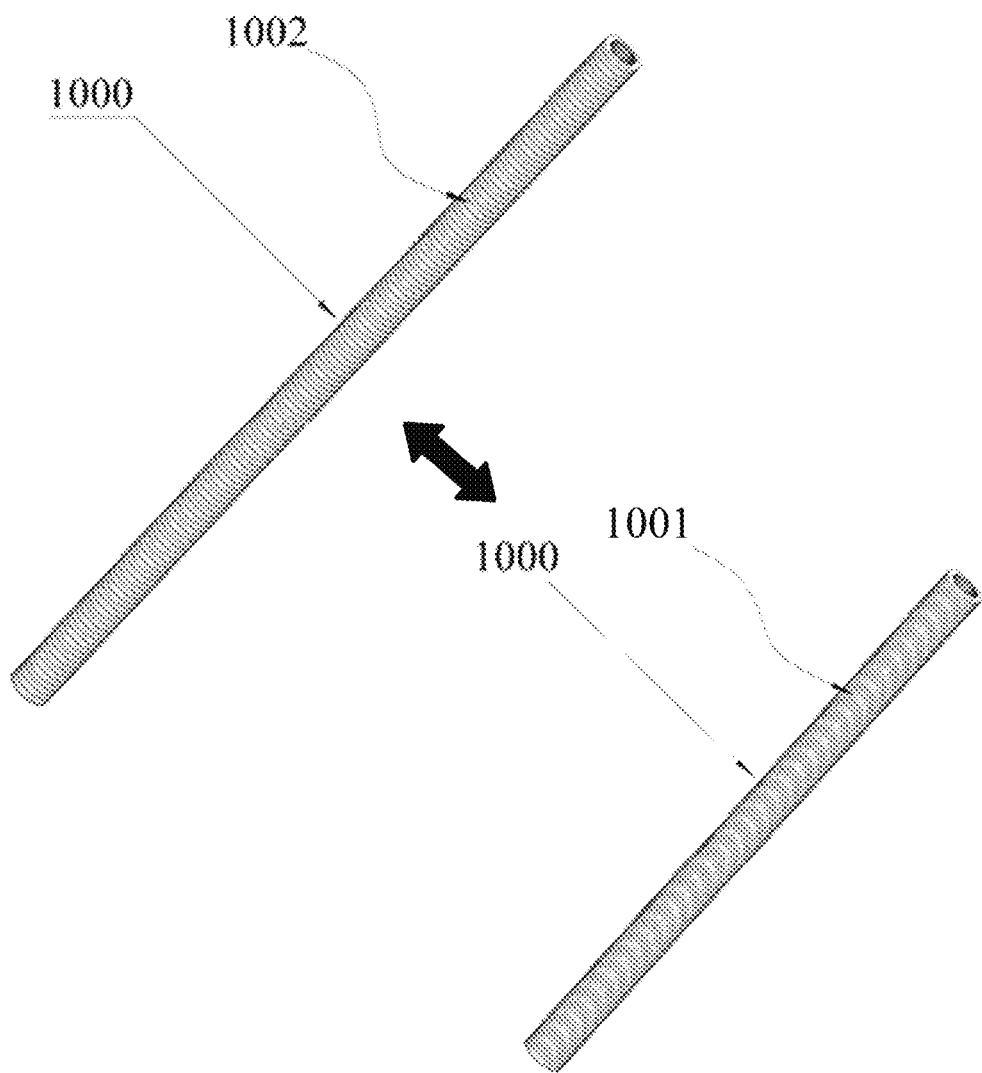
FIG. 1 is a schematic view of the structure of a pipe body shown in the expanded configuration (top) and compressed configuration (bottom)

Multi-layer composite water pipe (100); Pipe body (1000); Compressed configuration (1001); Extended configuration (1002); First tubular element (1003); Braided layer (1004); braided cord set (1005); Braided cord (1006); Second tubular element (1007); Input end (1008); Output end (1009); First internal thread (1010); Protective layer (1101); Adapter (2000); First connecting end (2001); Second connecting end (2002); Water inlet channel (2003); Water outlet channel (2004); Chute (2101); Buckle (2102); First fastener (2103); Sliding block (2104); Sealing sleeve (2105); First external thread (2106); Tapered opening (2107); Annular boss (2005); Fixing buckle (2201); Fluid delivery channel (2202); Receiving end (2203); Water flow passage (2204); Second external thread (2205); Connecting part (2006); Water flow channel (2007); Second external thread (2008); Fastening device (3000); Fixture (3001); Fastener (3002); Fixing part (3003); Clip (3004); Projection (3005); Gap (3006); Second internal thread (3007).

DESCRIPTION OF EMBODIMENTS

In describing the preferred embodiments, specific terminology will be resorted to for the sake of clarity. It is to be understood that each specific term includes all technical equivalents which operate in a similar manner to accomplish a similar purpose.

While various aspects and features of certain embodiments have been summarized above, the following detailed description illustrates a few exemplary embodiments in further detail to enable one skilled in the art to practice such embodiments. Reference will now be made in detail to embodiments of the inventive concept, examples of which are illustrated in the accompanying drawings. The accompanying drawings are not necessarily drawn to scale. The described examples are provided for illustrative purposes and are not intended to limit the scope of the invention. It should be understood, however, that persons having ordinary skill in the art may practice the inventive concept without these specific details.

It will be understood that, although the terms first, second, etc. may be used herein to describe various elements, these elements should not be limited by these terms. These terms are only used to distinguish one element from another. For example, a first attachment could be termed a second attachment, and, similarly, a second attachment could be termed a first attachment, without departing from the scope of the inventive concept.

It will be understood that when an element or layer is referred to as being "on," "coupled to," or "connected to" another element or layer, it can be directly on, directly coupled to or directly connected to the other element or layer, or intervening elements or layers may be present. In contrast, when an element is referred to as being "directly on," "directly coupled to," or "directly connected to" another element or layer, there are no intervening elements or layers present. Like numbers refer to like elements throughout. As used herein, the term "and/or" includes any and all combinations of one or more of the associated listed items.

As used in the description of the inventive concept and the appended claims, the singular forms "a," "an," and "the" are intended to include the plural forms as well, unless the context clearly indicates other.

The present invention provides a multi-layer composite water pipe 100, as shown in FIG. 1, comprising a pipe body 1000 having equally spaced extensible corrugations defining that the pipe body 1000 comprises at least one compressed configuration 1001 and at least one extended configuration 1002; the pipe body 1000 has a corrugated structure with equal intervals, which not only enhances the strength of the water pipe 100, prevents the water pipe 100 from cracking during use, but also enables the water pipe 100 to maintain a good shape when compressed and extended. In addition, the pipe body 1000 is made of plastic material, which has the characteristics of light weight, corrosion resistance, low cost and the like, and can effectively reduce the production cost.

Figure 2:
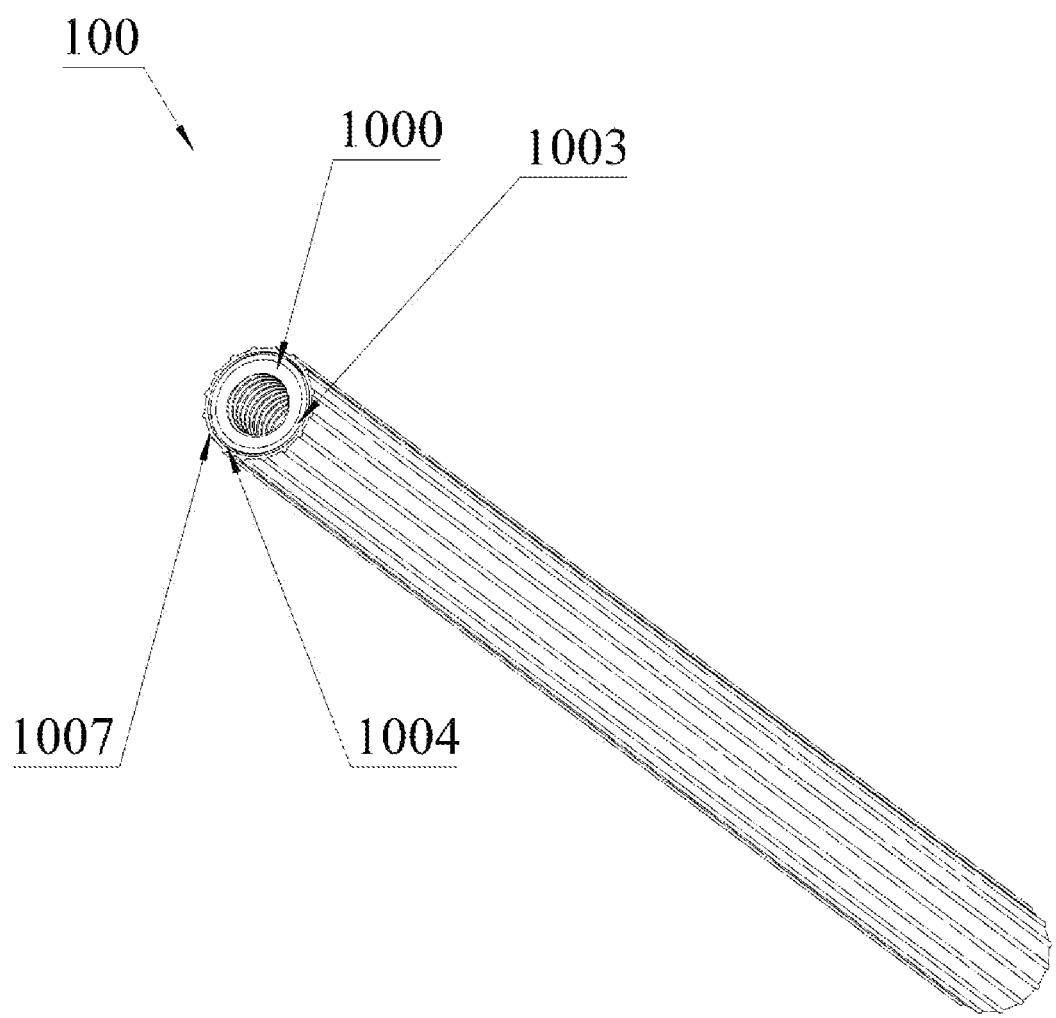
FIG. 2 is a schematic view showing the structure of a water pipe.
Figure 3:
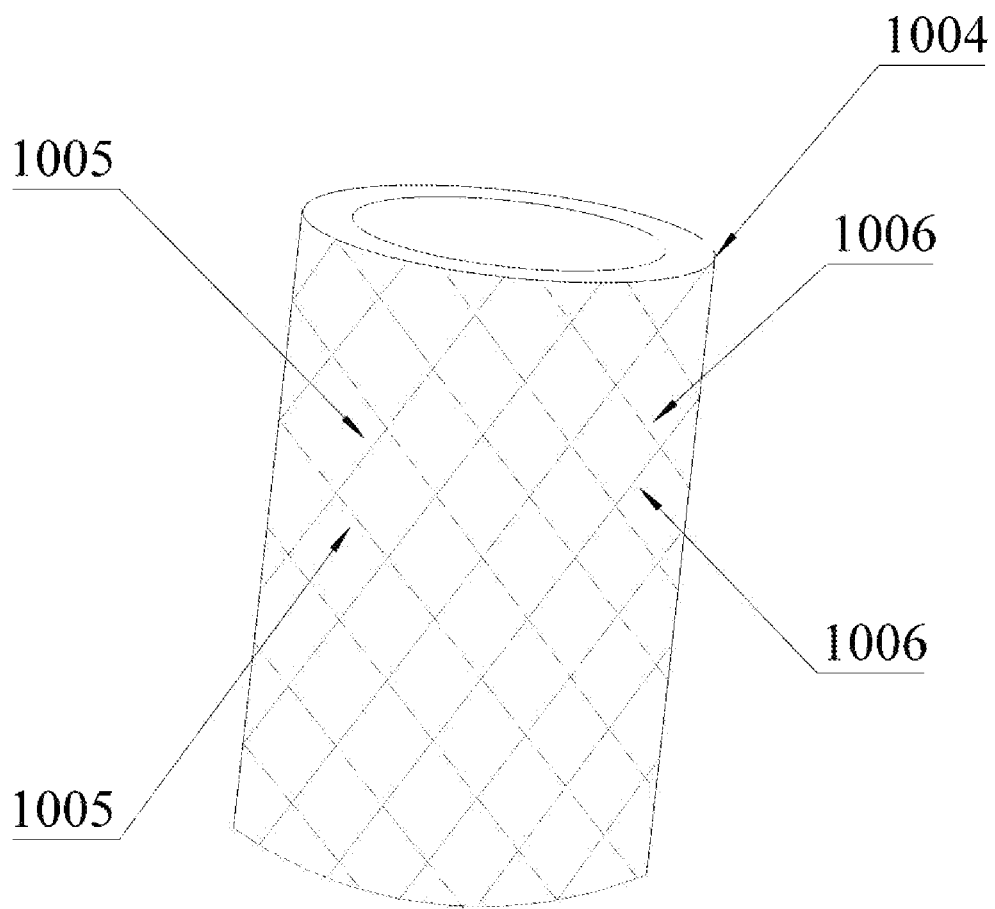
FIG. 3 is an enlarged fragmentary structural view of a braided layer.

In the present embodiment, as shown in FIG. 2, an outer side of the pipe body 1000 is provided with a first tubular element 1003, the first tubular element 1003 is made of an elastic material, an outer side of the first tubular element 1003 is provided with an extensible braided layer 1004, and the braided layer 1004 is made of a fabric material; the braided layer 1004 includes at least two braided cord sets 1005, as shown in FIG. 3, wherein each set 1005 of braided cords includes twelve braided cords 1006, the twelve braided cords 1006 are distributed in parallel, and every two braided cord sets 1005 are cross-wound on the first tubular element 1003 to form a continuous diamond-shaped mesh structure; the braided layer 1004 is provided with a second tubular element 1007 outside, and the second tubular element 1007 is made of an elastic material; the first tubular element 1003, the braided layer 1004 and the second tubular element 1007 are all extendable or compressible in the direction of change of length of the pipe body 1000; wherein the first tubular element 1003 and the second tubular element 1007 are made of an elastic material, and may provide additional protection to the pipe body 1000, thereby preventing physical damage; the braided layer 1004 can effectively prevent the water pipe 100 from over-expanding due to excessive water pressure, which may otherwise damage the water pipe 100; the pipe body 1000, the first tubular element 1003, the braided layer 1004, and the second tubular element 1007 can all be extended or compressed in varying directions of length, which makes it possible to adapt the pipe to a variety of different installation environments and use conditions.

Figure 4:
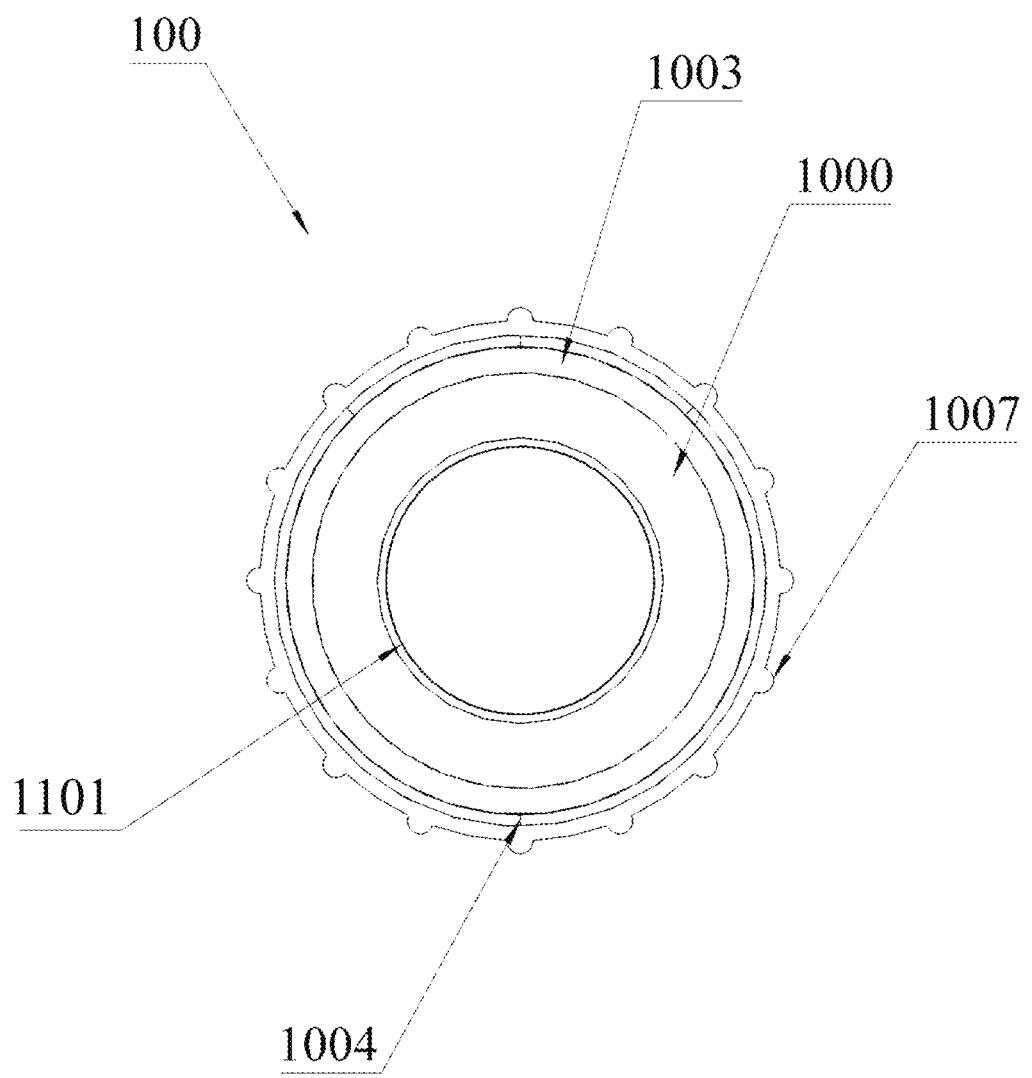
FIG. 4 is a schematic view showing a structure of a water pipe according to another embodiment.

In another embodiment, as shown in FIG. 4, the inside of the pipe body 1000 is further provided with a protective layer 1101, wherein the protective layer 1101 has a corrugated structure corresponding to the pipe body 1000; the protective layer 1101 is made of a plastic material, preferably, the protective layer 1101 may be made of a polypropylene (PP) material, which has good corrosion resistance and can protect the pipe body 1000 from corrosion, thereby extending the service life of the pipe; and the protective layer 1101 has a corrugated structure, which can increase the thickness and hardness of the protective layer 1101, thereby improving the abrasion resistance of the water pipe 100; furthermore, the corrugated structure can change the flow path of the fluid inside the water pipe 100, thereby reducing the fluid resistance and improving the flow efficiency of the fluid.

In the present embodiment, the elastic material comprises one of natural rubber, synthetic rubber, thermoplastic rubber, natural or synthetic vulcanized rubber, latex, and a mixture of one or more of natural rubber, synthetic rubber, thermoplastic elastomer, natural or synthetic vulcanizate, and latex; these materials generally have good elasticity, wear resistance and weather resistance, while also maintain good performance under various environmental conditions, can prevent the water pipe 100 from being damaged in harsh environments, and allow the water pipe 100 to have a long service life; preferably, the elastic material is a thermoplastic rubber (TPR) material, the thermoplastic rubber (TPR) has a high elastic property, and good elongation, resilience and wear resistance, and the thermoplastic rubber (TPR) is simple to process and can effectively save consumption of human power during production.

In this embodiment, the pipe body 1000 is made of a plastic material, wherein the plastic material comprises one of polypropylene, polyethylene, polystyrene, polyvinyl chloride, or ethylene-vinyl acetate copolymer, and a mixture of one or more of polypropylene, polyethylene, polystyrene, polyvinyl chloride, or ethylene-vinyl acetate copolymer; these materials generally have good tensile strength, rigidity and abrasion resistance, and by mixing, a new material with better overall properties can be obtained; preferably, the extensible plastic material is a polypropylene (PP) material, polypropylene (PP) has good heat resistance as well as high elastic properties, and has stable chemical properties, capable of stable operation under harsh environments such as high temperature and high pressure, it is inexpensive to produce, efficient reduction in production costs; as another preferred extensible plastic material in this embodiment is a mixture of polypropylene (PP) and ethylene-vinyl acetate copolymer (EVA); polypropylene (PP) and ethylene-vinyl acetate copolymer (EVA) both have good corrosion properties against chemicals such as acids, bases, salts, and the like, able to work stably under high temperature, high pressure and harsh environment, and has good anti-ultraviolet and anti-oxidation properties, can be used outdoors for a long period of time; mixing of polypropylene (PP) and ethylene-vinyl acetate copolymer (EVA) as a manufacturing material of the water pipe 100 will show better performance and longer service life in practical applications, and also be more economical and environmental friendly.

In this embodiment, the fabric material comprises one of cotton, wool, silk, polyester, nylon, or polypropylene, and a mixture of one or more of cotton, wool, silk, polyester, nylon, or polypropylene; among them, cotton, wool and silk have good moisture absorption and breathability, as well as good extensibility; polyester, nylon and polypropylene have good strength and elastic properties, as well as good plasticity. Different fabric materials have different physical properties such as softness, elasticity, moisture absorption, warmth and the like. By blending them, a new material can be obtained with a better overall combination of properties, and the overall cost can be reduced while maintaining the desired properties. Preferably, the fabric material is a polyester material, which is strong in plasticity and chemically stable, and which has high strength and good elastic properties.

In the present embodiment, the pipe body 1000 has a change in length between the compressed configuration 1001 and the extended configuration 1002 of 1.2-5 times the pipe body 1000; specifically, the pipe body 1000 has a change in length between the compressed configuration 1001 and the extended configuration 1002 of 2-2.5 times the pipe body 1000; the length of the pipe body 1000 can be adjusted as desired, which allows the pipe to be adapted to a variety of different installation environments and service conditions.

Figure 5:
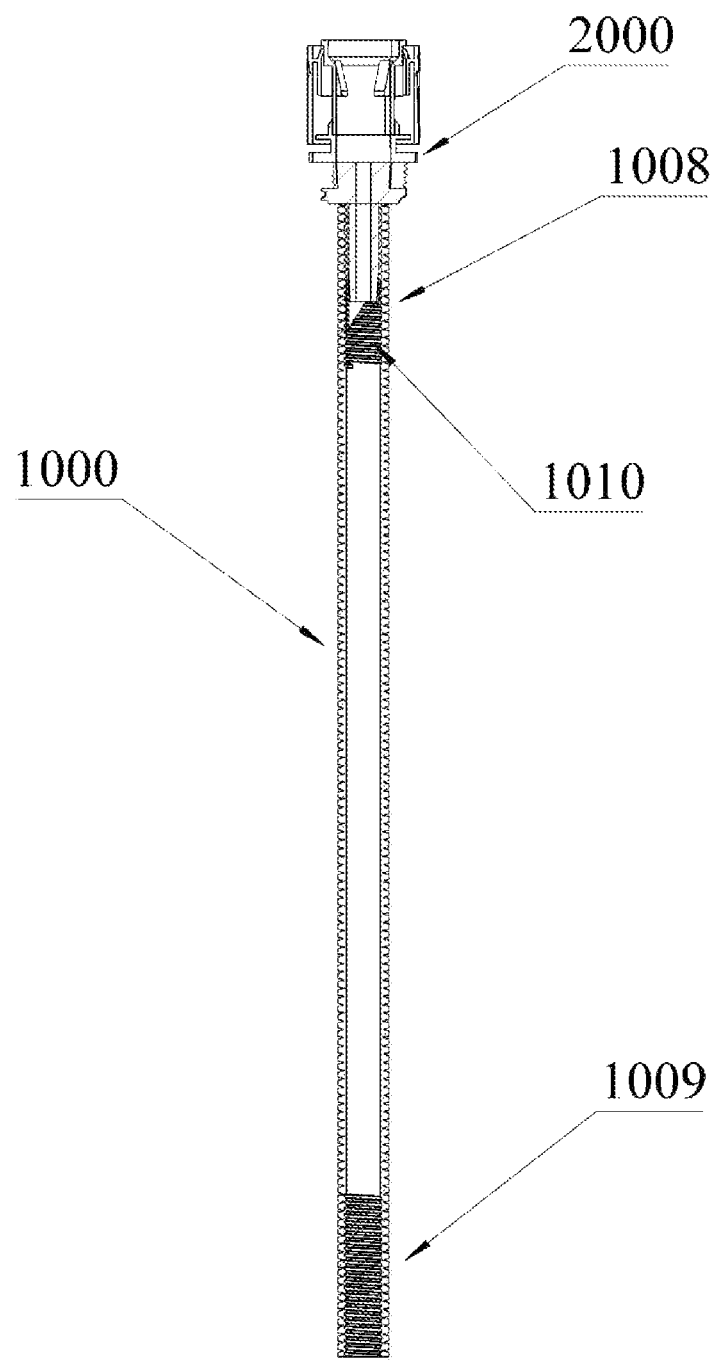
FIG. 5 is a schematic view showing the connection of the pipe body to the adapter.

In the present embodiment, as shown in FIG. 5, the pipe body 1000 comprises an input end 1008 and an output end 1009; an adapter 2000 is detachably connected to the input end 1008; the pipe body 1000 has a circular cross-section, and at least part of the inner wall face of the input end 1008 is provided with a first internal thread 1010, wherein the design of the detachable connection between the input end 1008 and the adapter 2000 makes installation and maintenance of the water pipe 100 more convenient; if the water pipe needs to be replaced or cleaned, only the adapter 2000 needs to be removed, and the entire water pipe need not be replaced, which results in a cost saving and efficiency improvement. The pipe body 1000 has a circular cross-section, which has a hydrodynamic advantage, and can effectively reduce fluid resistance and improve fluid transfer efficiency.

In other embodiments (not shown), valves may be added to the adapter 2000 that can be operated to control the flow of water in the water line without shutting down the entire water source. In other embodiments (not shown), a filter may be added to the adapter 2000 to filter the water before it enters the pipe body 1000 to remove impurities that may be present. In other embodiments (not shown), a pressure regulator may be added to the adapter 2000 to adjust the water pressure in the water pipe as needed to meet different uses.

Figure 6:
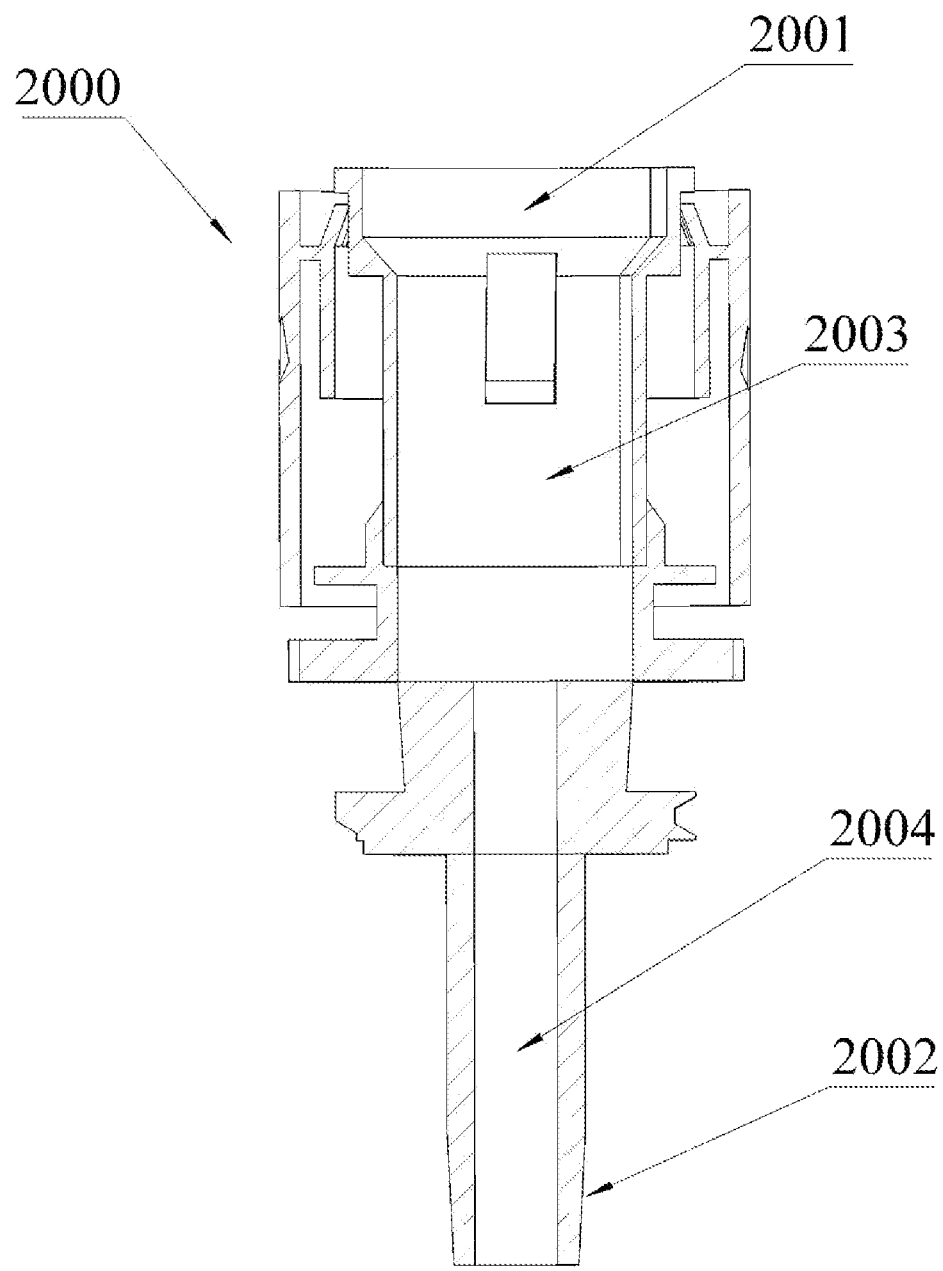
FIG. 6 is a cross-sectional view of an adapter.
Figure 7:
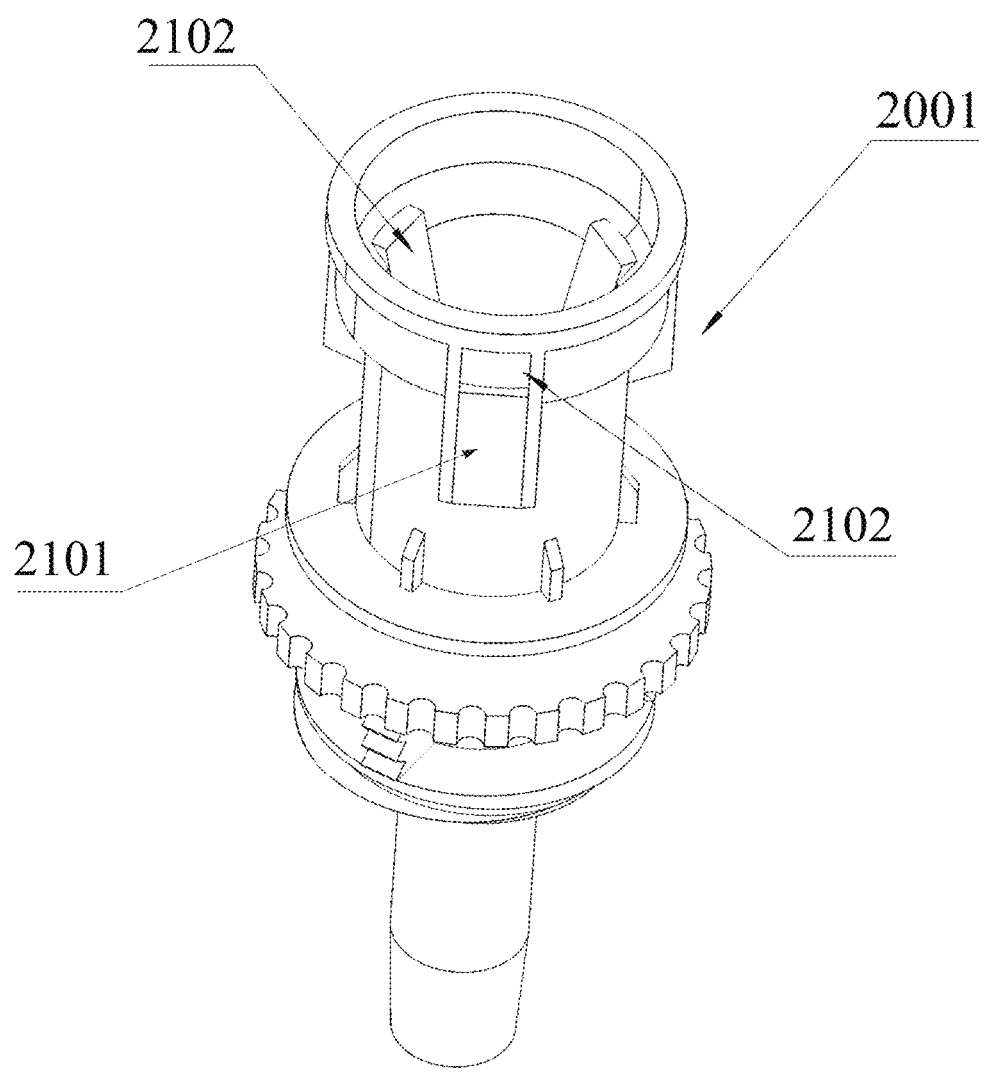
FIG. 7 is a block diagram of a first connecting end.

In this embodiment, as shown in FIG. 6, the adapter 2000 comprises a first connecting end 2001 and a second connecting end 2002, wherein the first connecting end 2001 and the second connecting end 2002 each have a circular cross section, the first connecting end 2001 and the second connecting end 2002 respectively define a water inlet channel 2003 and a water outlet channel 2004 along a central axis, wherein a diameter of the water inlet channel 2003 is larger than a diameter of the water outlet channel 2004; setting the diameter of the water inlet channel 2003 to be larger than the diameter of the water outlet channel 2004 can effectively reduce fluid resistance and improve fluid transfer efficiency.

Figure 8:
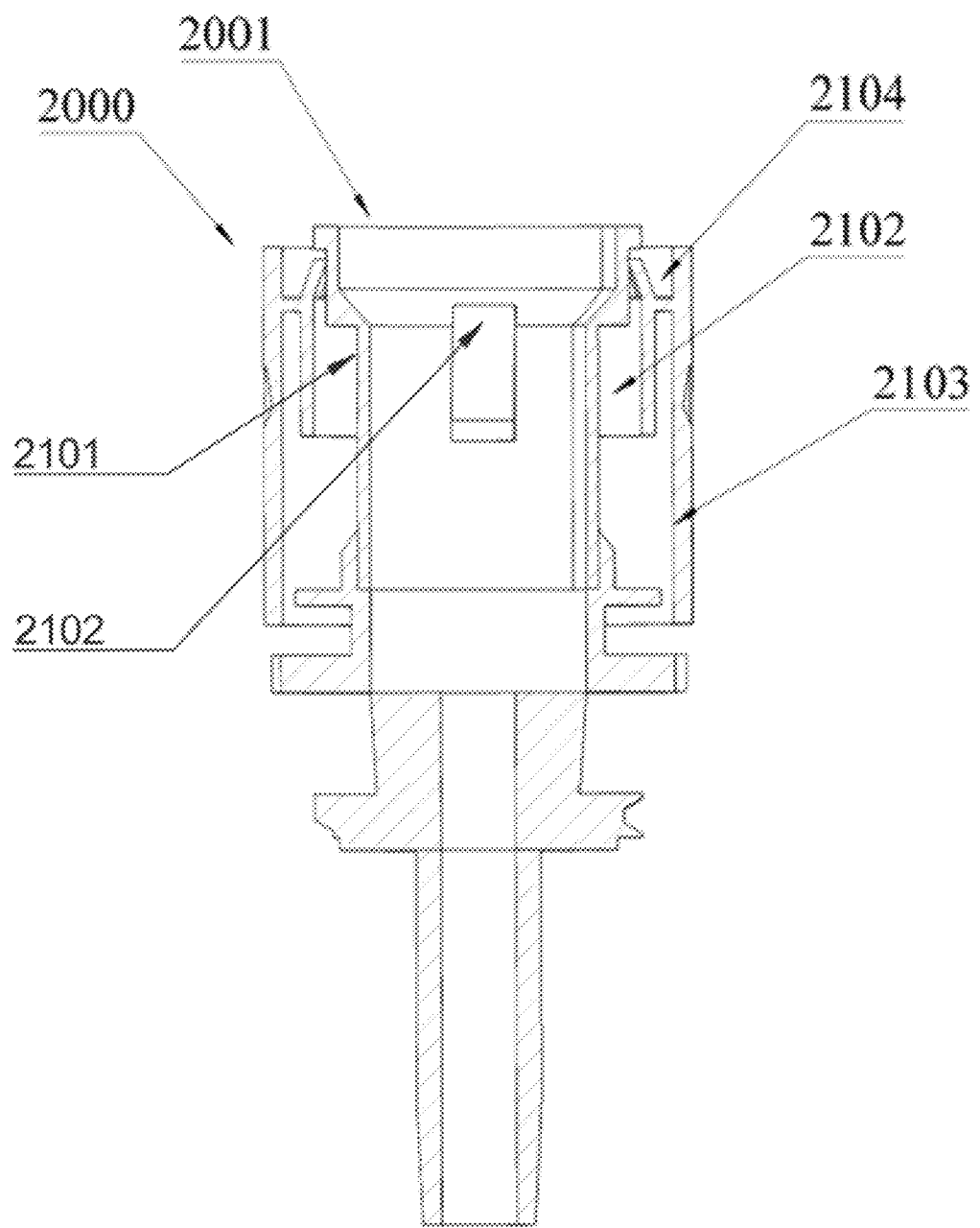
FIG. 8 is a cross-sectional view of a first fastener and a first connecting end.

In the present embodiment, as shown in FIGS. 8-8, the first connecting end 2001 can be connected with an external water supply device, the first connecting end 2001 is provided with three chutes 2101 on the first connecting end 2001; the inside of the chutes 2101 is provided with buckles 2102, and the outside of the first connecting end 2001 is provided with a first fastener 2103; the inner wall surface of the first fastener 2103 is provided with at least one sliding block 2104, and the sliding block 2104 can slide longitudinally along the chutes 2101 and push the buckles 2102 to be in a chucked or relaxed state; when the sliding block 2104 slides down the chute 2101, the buckle 2102 is in a relaxed state, the water outlet of the water supply device protrudes into the first connecting end 2001 and communicates with the water inlet channel 2003; when the sliding block 2104 slides up the chute 2101, the buckle 2102 locks the water outlet of the water supply device; by sliding the sliding block 2104 along the chute 2101, the buckle 2102 is pushed to fasten the connection with the water supply device, the stability of the connection can be enhanced, preventing the connecting end from loosening under the impact of the water flow, making the connection tighter, preventing the leakage of the water flow.

In other embodiments (not shown), four chutes 2101 are provided on the first connecting end 2001, or configured in any other desired number. In other embodiments (not shown), four sliding blocks 2104 are provided on the inner wall surface of the first fastener 2103, or the sliders are configured in any other desired number.

In other embodiments (not shown in the drawings), a filter is added at the inlet of the water inlet channel 2003 for filtering out impurities in the water, and the filter is detachably connected to the first connecting end 2001, thereby facilitating cleaning and replacement.

Figure 9:
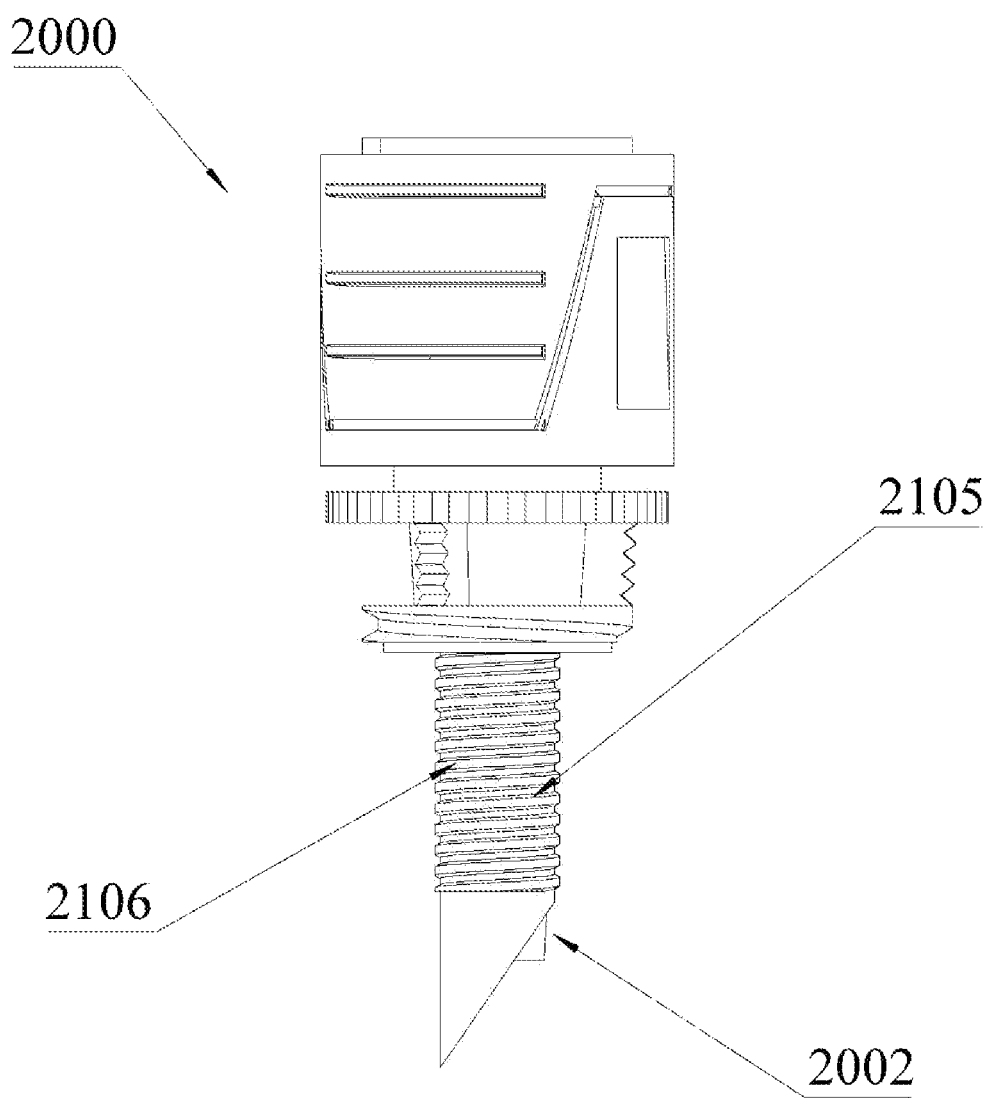
FIG. 9 is a schematic view showing the structure of a second connecting end.

In this embodiment, as shown in FIG. 9, the second connecting end 2002 is provided with a sealing sleeve 2105, and the outer side of the sealing sleeve 2105 is provided with a first external thread 2106, and the first internal thread 1010 is coupled to the first external thread 2106, so that the adapter 2000 is detachably coupled to the pipe body 1000; wherein the adapter 2000 is detachably connected with the pipe body 1000 by a thread, to make the mounting and dismounting process simpler and easier, no special tools are required, and the working efficiency is greatly improved; if the adapter 2000 or the pipe body 1000 needs to be replaced or serviced, it can be conveniently disassembled without replacing the entire system, thereby saving cost and time, and in addition, by providing the sealing jacket 2105, the leakage of liquid or gas can be effectively prevented, ensuring the tightness of the system.

In the present embodiment, the sealing sleeve 2105 is made of a rubber material; the rubber material has good wear resistance and can maintain its shape and size during use for a long time, thereby guaranteeing stability of connection; the rubber material has good elasticity and can provide a certain buffer during the connecting process, preventing hard things from directly contacting the connecting end, thereby avoiding the damage to which the connecting end may be subjected; in addition, the rubber material has a good sealing property, which prevents leakage of liquid or gas, and improves the sealing property of the connection.

In other embodiments (not shown), the sealing sleeve 2105 is made of a silicone material. Silicone materials have good heat and cold resistance, allowing the connection to maintain good performance in a variety of temperature environments. At the same time, the flexibility and elasticity of the silicone material is good, and it can provide a certain buffer during the connection process, preventing the hard object from directly contacting the connecting end, thereby avoiding possible damage to the connecting end.

In other embodiments (not shown), the sealing sleeve 2105 is made of a polyurethane material. The polyurethane material has good abrasion and impact resistance and can maintain its shape and size during use over a long period of time, thereby ensuring the stability of the connection. At the same time, the polyurethane material has a better sealing property to prevent leakage of liquid or gas and improve the sealing property of the connection.

In other embodiments (not shown in the drawings), the second connecting end 2002 and the input end 1008 are connected by a buckling, which can provide a quick and convenient connection, making the mounting and dismounting process more convenient, thereby improving the ease of use. In other embodiments (not shown), the second connecting end 2002 and the input end 1008 are connected by welding, which can provide extremely high connection strength and good sealing properties, making the connection more stable and preventing leakage of liquid or gas, thereby improving the stability and sealing properties of the connection.

Figure 10:
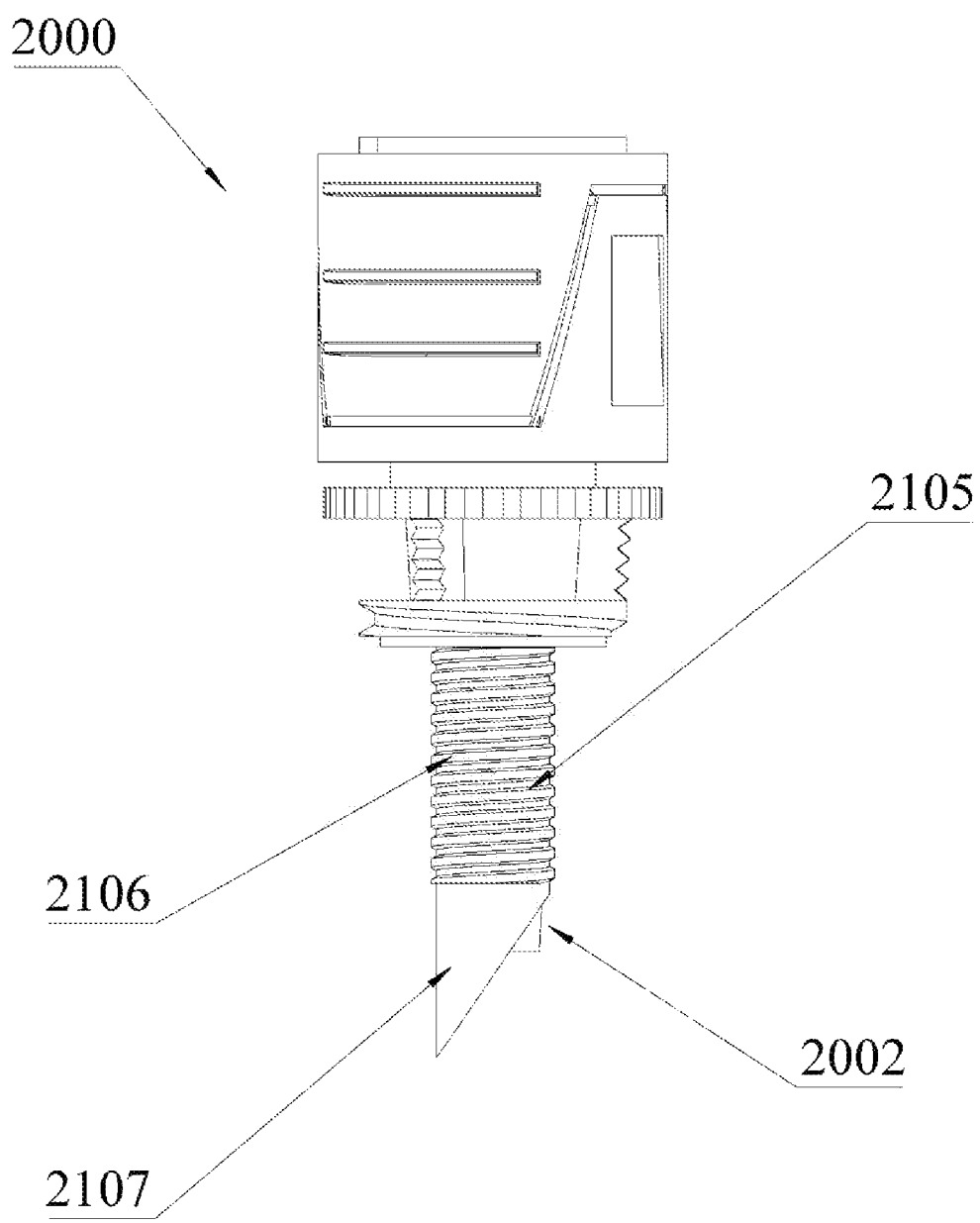
FIG. 10 is a schematic view of the construction of a sealing sleeve.

In this embodiment, as shown in FIG. 10, the sealing sleeve 2105 has a tapered opening 2107 thereon and the outer diameter of the second connecting end 2002 is less than the inner diameter of the pipe body 1000; wherein, due to the outer diameter of the second connecting end 2002 being smaller than the inner diameter of the pipe body 1000, this makes it possible for the second connecting end 2002 to be easily inserted into the pipe body 1000, thereby simplifying the installation process; at the same time, the tapered opening 2107 can act as a guide structure to help the second connecting end 2002 to be more accurately aligned with the inner diameter of the pipe body 1000, thereby enabling automatic positioning; when the second connecting end 2002 is inserted into the pipe body 1000, the tapered opening 2107 can be closely aligned with the inner wall of the pipe body 1000, thereby providing a good sealing effect to prevent leakage of liquid or gas.

Figure 11:
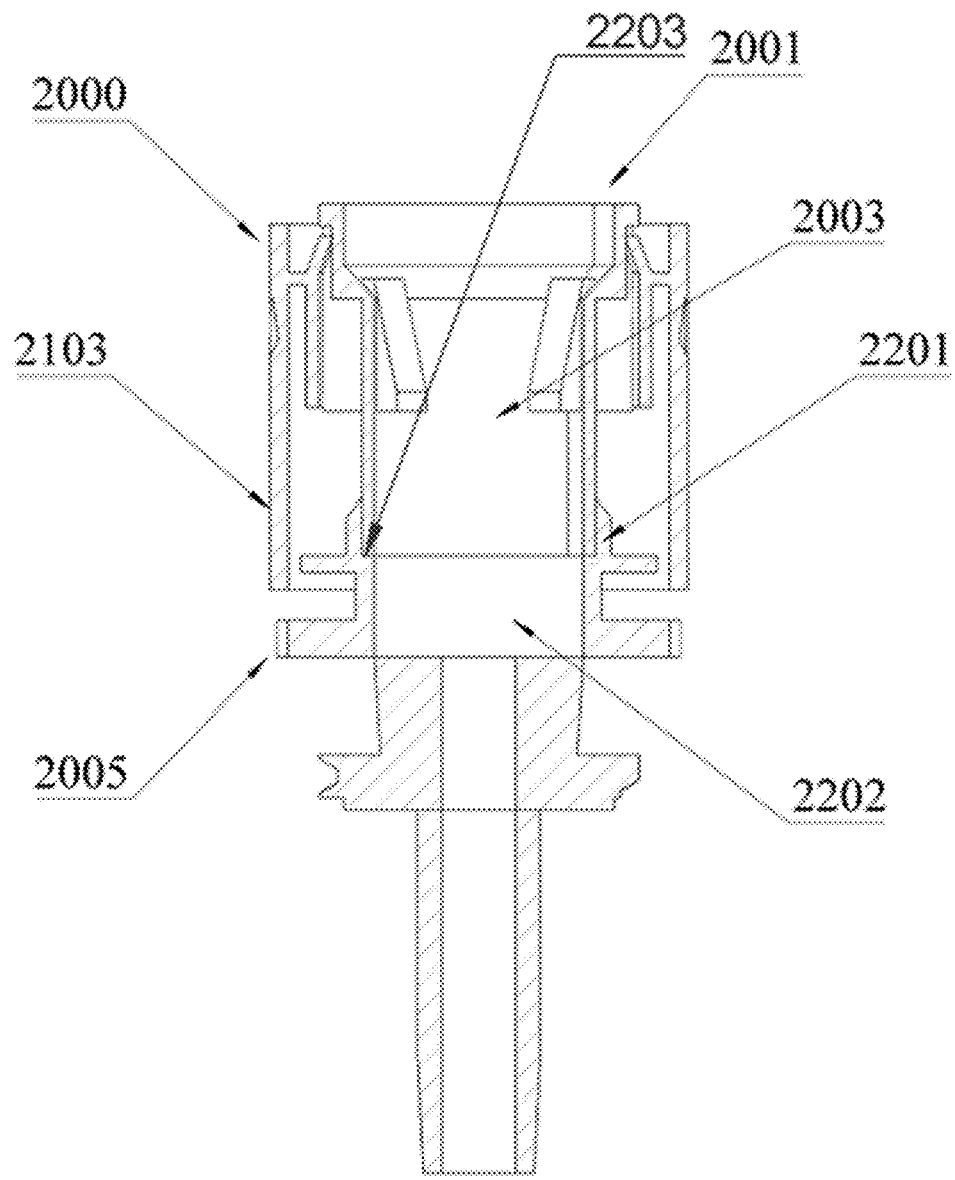
FIGS. 11-12 are cross-sectional views of an annular boss.

In the present embodiment, as shown in FIG. 11, the adapter 2000 further comprises an annular boss 2005, and an upper end of the annular boss 2005 comprises six fixing buckles 2201, wherein the six fixing buckles 2201 are evenly distributed along a circumference, and a lower end part of the first connecting end 2001 communicates with the annular boss 2005 and is fixedly connected by the fixing buckles 2201; the annular boss 2005 further comprises a fluid delivery channel 2202 having approximately the same diameter as the water inlet channel 2003; by providing the fixing buckles 2201, the first connecting end 2001 can be stably connected to the annular boss 2005 to prevent loosening or dislodging during use, and since the diameter of the fluid delivery channel 2202 is substantially the same as the diameter of the intake channel 2003, the flow efficiency of the fluid in the tubing can be ensured, avoiding a change in flow rate or pressure loss due to a change in the channel diameter.

In other embodiments (not shown), the upper end of the annular boss 2005 includes seven fixing buckles 2201, or the fixing buckles are configured in any other desired number, to improve the stability and reliability of the connection.

In other embodiments (not shown), a locking mechanism may be added to the fixing buckles 2201 to ensure that the fastener cannot be accidentally opened during the connection process, thereby providing greater security against connection failure due to accidental opening of the fixing buckles 2201.

In other embodiments (not shown), a sealing ring is provided between the annular boss 2005 and the first connecting end 2001, and the sealing ring can be provided to prevent leakage of liquid, thereby providing better sealing performance.

Figure 12:
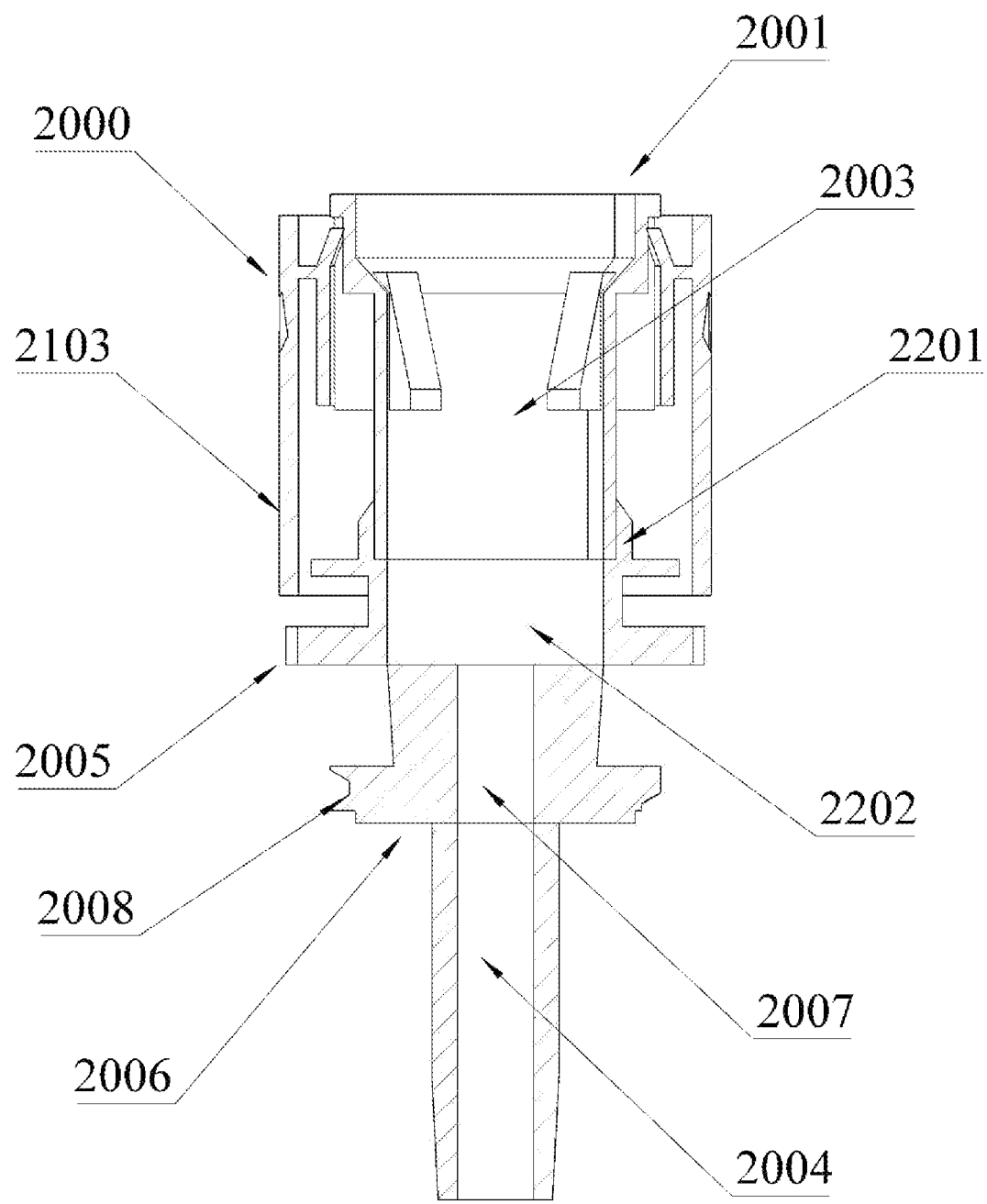

In the present embodiment, as shown in FIG. 12, the annular boss 2005 further includes a receiving end 2203, and the receiving end 2203 receives and limits the distance that the first fastener 2103 slides longitudinally; the lower end of the annular boss 2005 is provided with a connecting part 2006, and the inside of the connecting part 2006 is provided with a water flow passage 2007 having approximately the same diameter as the water outlet channel 2004; the water flow passage 2007 communicates the fluid delivery channel 2202 with the water outlet channel 2004; the connecting part 2006 is further provided with a second external thread 2008; in this case, the receiving end 2203 can be effectively prevented from loosening or falling off during use, thereby improving the stability of the connection, and at the same time, since the diameter of the water flow passage 2007 is substantially the same as the diameter of the outlet channel 2004, the flow efficiency of the fluid in the pipe can be ensured, thereby avoiding a change in flow rate or a pressure loss due to a change in the diameter of the channel.

Figure 13:
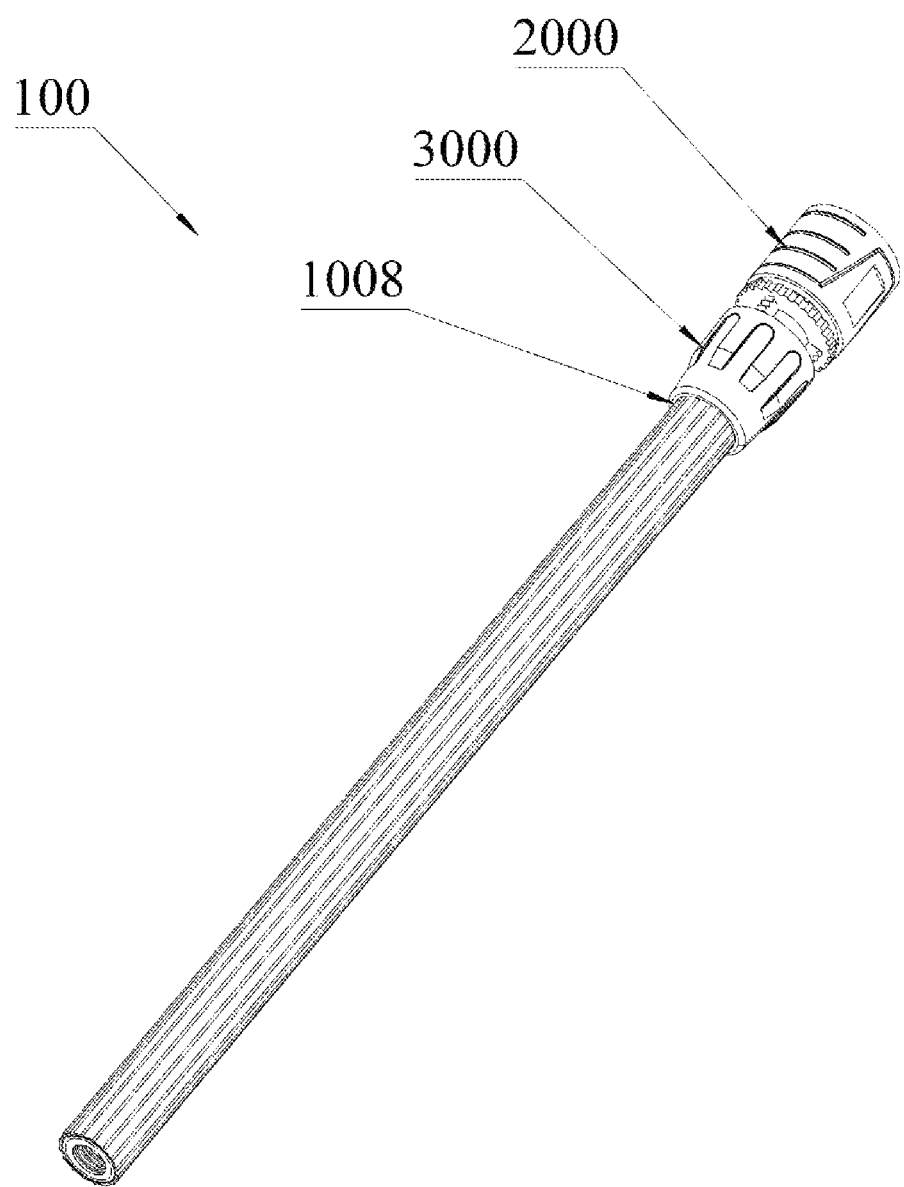
FIGS. 13-14 are schematic views showing the structure of the fastening device.
Figure 14:
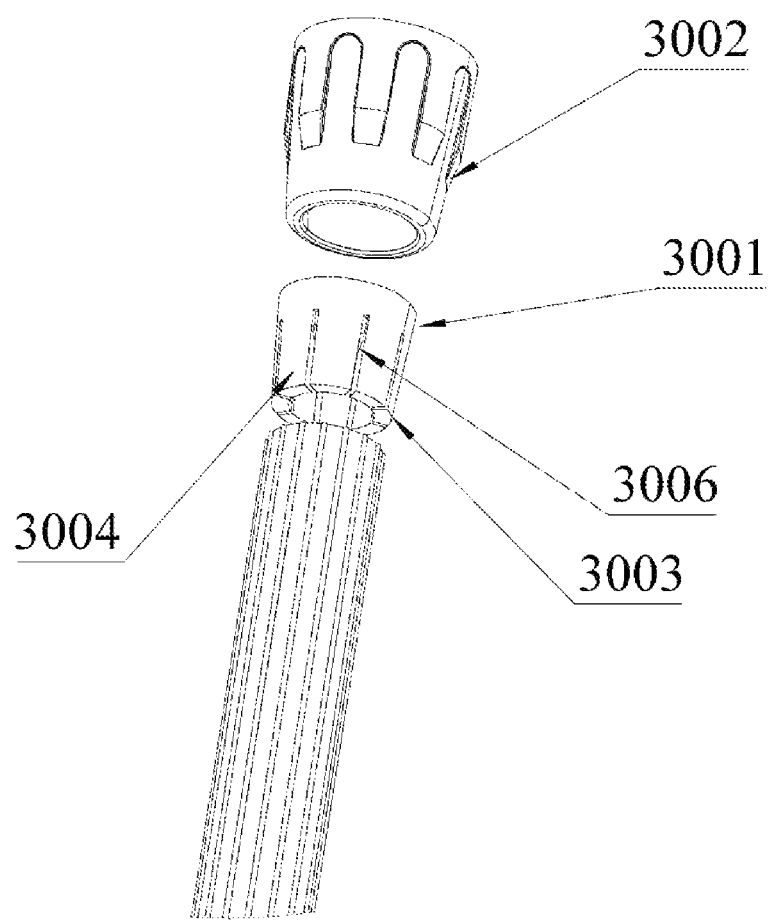

In this embodiment, as shown in FIGS. 13-14, a fastening device 3000 is provided at the connection of the input end 1008 and the adapter 2000, and the fastening device 3000 includes a fixture 3001, and a fastener 3002 sleeved on the fixture 3001; each of the fixture 3001 and the fastener 3002 has a cylindrical configuration with a varying diameter in the axial direction. Wherein the diameter of the fixture 3001 is not less than the diameter of the pipe body 1000; by providing the fastening device 3000, the input end 1008 and the adapter 2000 can be stably connected together, preventing loosening or dislodging during use.

Figure 15:
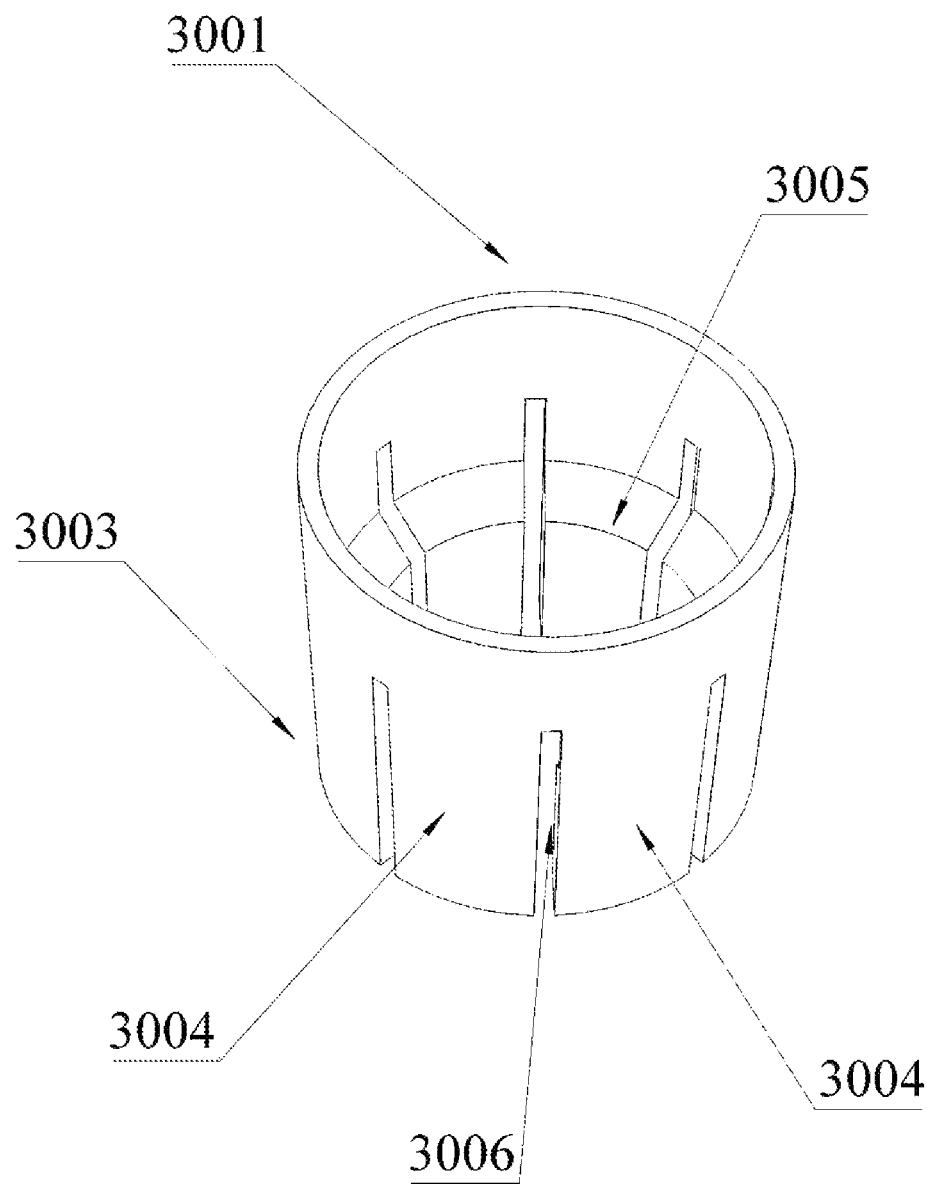
FIG. 15 is a schematic view showing the structure of a fixture.

In the present embodiment, as shown in FIG. 15, the fixture 3001 comprises a fixing part 3003, and the fixing part 3003 comprises a plurality of circumferentially evenly distributed clips 3004, wherein projections 3005 are arranged on the inner sides of the clips 3004, and gaps 3006 are arranged between adjacent clips 3004; wherein by providing the projections 3005 on the inner sides of clips 3004, they can be more firmly engaged with the water pipe 100 to prevent loosening or dislodging during use, and the gaps 3006 between adjacent clips 3004 provide a space for the fixture 3001 to extend and contract to accommodate the expansion or contraction of the water pipe 100 under the pressure of the water, thereby improving the stability of the connection.

In other embodiments (not shown), an anti-slip texture is added to the projection 3005, which can provide better stability by increasing friction and preventing the fixture 3001 from slipping during use.

Figure 16:
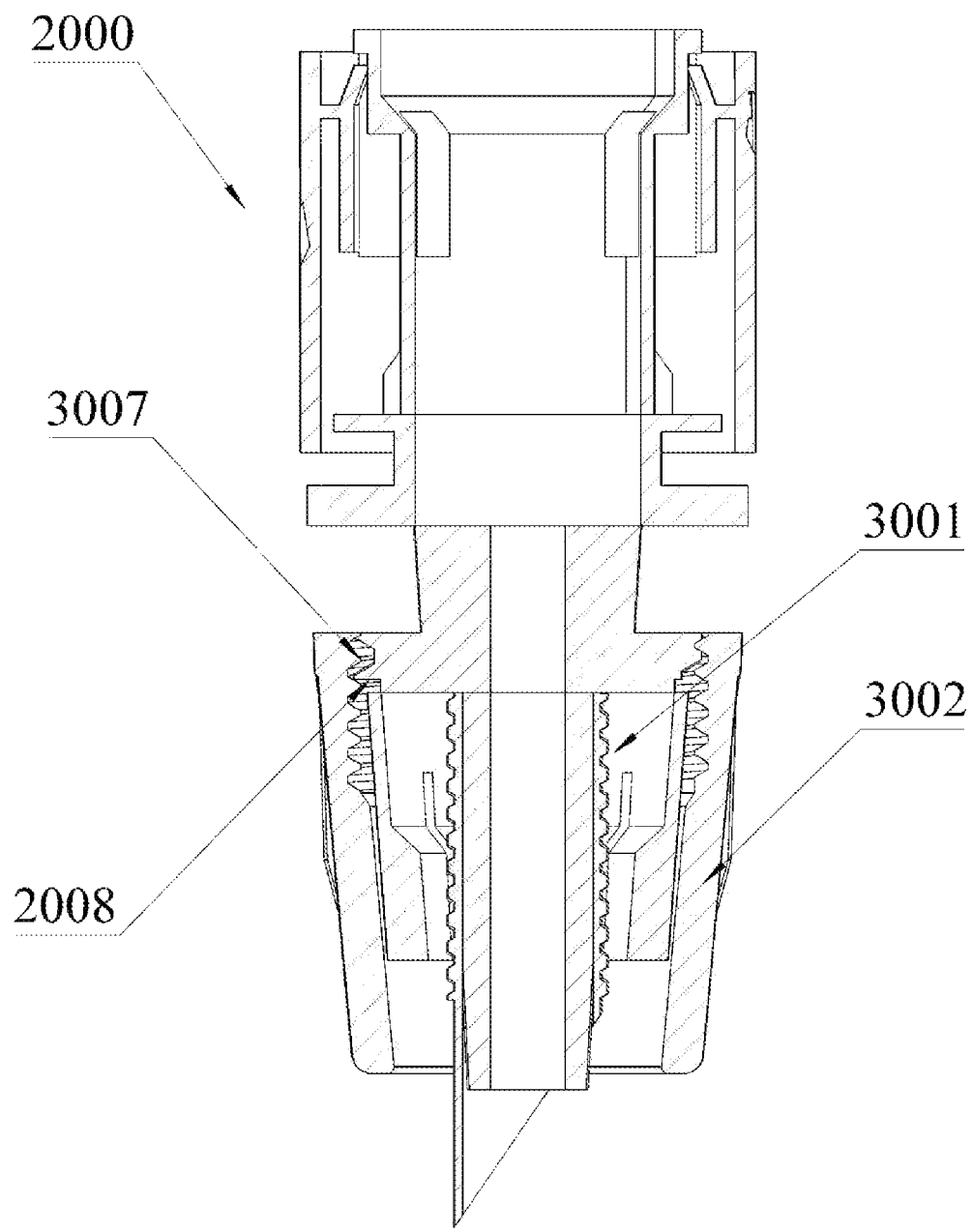
FIG. 16 is a schematic cross-sectional view of the connection of the fastener to the adapter.

In this embodiment, as shown in FIG. 16, at least a part of the inner side of the fastener 3002 is provided with a second internal thread 3007, and the second external thread 2008 is coupled to the second internal thread 3007, thereby fastening the fastener 3002 to the adapter 2000; by threaded connection, the process of mounting and dismounting is facilitated and quick, requiring no special tools, greatly improving the work efficiency, and the threaded connection can provide a stable connection against loosening or dislodging during use.

The present invention provides a process for manufacturing a multi-layer composite water pipe 100, the production process comprising the steps of: preparing a material for making a pipe body 1000 and a first extruder; preparing a material for a first tubular element 1003 and a second extruder; preparing a fabric material and a knitting machine for making a braided layer 1004; preparing a material for making a second tubular element 1007 and a third extruder; sequentially arranging said first extruder, said second extruder, said braiding machine, and said third extruder; and preparing an adapter 2000 and a fastening device 3000; and starting the machine, introducing a pipe body 1000 extruded by said first extruder into said second extruder, said second extruder extruding a first tubular element 1003 covering said pipe body 1000 outside said pipe body 1000; introducing the pipe body 1000 and the first tubular element 1003 into said braiding machine, braiding a braided layer 1004 covering said first tubular element 1003 outside said first tubular element 1003, said third extruder extruding the second tubular element 1007 covering said pipe body 1000 outside the braided layer 1004; forming a continuous water pipe 100; and cutting said continuous water pipe 100 to a desired length; and connecting said adapter 2000 to both ends of the cut water pipe 100, and fitting said fastening device 3000 at a joint of said adapter 2000 and said water pipe 100.

In another process of manufacturing a multi-layer composite water pipe 100, the process includes: preparing a fourth extruder and the material of the protective layer 1101, activating the first extruder and the fourth extruder simultaneously, extruding the pipe body 1000 simultaneously with the protective layer 1101 inside the pipe body 1000, introducing the pipe body 1000 into the second extruder, extruding the first tubular element 1003 covering the pipe body 1000 outside the pipe body 1000; introducing the pipe body 1000 and the first tubular element 1003 into a braiding machine, braiding a braided layer 1004 covering the first tubular element 1003 outside the first tubular element 1003, a third extruder extruding a second tubular element 1007 covering the pipe body 1000 outside the braided layer 1004; and forming a continuous water pipe 100.

The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Similarly, the use of "based at least in part on" is meant to be open and inclusive, in that a process, step, calculation, or other action "based at least in part on" one or more recited conditions or values may, in practice, be based on additional conditions or values beyond those recited. Headings, lists, and numbering included herein are for ease of explanation only and are not meant to be limiting.

The various features and processes described above may be used independently of one another, or may be combined in various ways. All possible combinations and sub-combinations are intended to fall within the scope of the present disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed examples. Similarly, the example systems and components described herein may be configured differently than described. For example, elements may be added to, removed from, or rearranged compared to the disclosed examples.

The invention has now been described in detail for the purposes of clarity and understanding. However, those skilled in the art will appreciate that certain changes and modifications may be practiced within the scope of the appended claims.

Conditional language used herein, such as, among others, "can," "could," "might," "may," "e.g.," and the like, unless specifically stated otherwise, or otherwise understood within the context as used, is generally intended to convey that certain examples include, while other examples do not include, certain features, elements, and/or steps. Thus, such conditional language is not generally intended to imply that features, elements and/or steps are in any way required for one or more examples or that one or more examples necessarily include logic for deciding, with or without author input or prompting, whether these features, elements and/or steps are included or are to be performed in any particular example.

What is claimed is:

1. A multi-layer composite water pipe, comprising a pipe body, wherein said pipe body has equally spaced extensible corrugations defining that said pipe body comprises at least one compressed configuration and at least one extended configuration; and said pipe body is variable in length between said at least one compressed configuration and said at least one extended configuration;
   wherein an outer side of said pipe body is provided with a first tubular element made of an elastic material;
   wherein an outer side of said first tubular element is provided with an extensible braided layer made of a fabric material, and said braided layer comprises at least two braided cord sets; and said braided cord sets comprise at least two braided cords distributed in parallel, and said at least two braided cord sets are cross-wound on said first tubular element to form a continuous diamond-shaped mesh structure;
   wherein an outer side of said braided layer is provided with a second tubular element made of an elastic material, and said first tubular element, said braided layer and said second tubular element are all extendable or compressible in a change direction of a length of said pipe body; and
   wherein said pipe body has a change in length between said at least one compressed configuration and said at least one extended configuration of 1.2-5 times said pipe body;
   wherein said pipe body comprises an input end and an output end; and said input end has an adapter detachably connected thereto, said pipe body has a circular cross-section, and at least a part of an inner wall surface of said input end is provided with a first internal thread;
   wherein said adapter comprises a first connecting end and a second connecting end;
   wherein said second connecting end is provided with a sealing sleeve, and an outer side of said sealing sleeve is provided with a first external thread, and said first internal thread is in mating connection with said first external thread, so that said adapter is detachably connected with said pipe body; and
   wherein said sealing sleeve has an end having a taper, said sealing sleeve has an opening along the taper, and said second connecting end has an outer diameter not greater than an inner diameter of said pipe body.

2. The multi-layer composite water pipe according to claim 1, wherein said elastic material of the first tubular element and/or the second tubular element comprises one of natural rubber, synthetic rubber, thermoplastic rubber, natural or synthetic vulcanized rubber and latex, and a mixture of one or more of said natural rubber, synthetic rubber, thermoplastic rubber, natural or synthetic vulcanized rubber and latex.

3. The multi-layer composite water pipe according to claim 2, wherein said pipe body is made of a plastic material comprising one of polypropylene, polyethylene, polystyrene, polyvinyl chloride or ethylene-vinyl acetate copolymer, and a mixture of one or more of said polypropylene, polyethylene, polystyrene, polyvinyl chloride or ethylene-vinyl acetate copolymer.

4. The multi-layer composite water pipe according to claim 3, wherein said fabric material comprises one of cotton, wool, silk, polyester, nylon or polypropylene, and a mixture of one or more of said cotton, wool, silk, polyester, nylon or polypropylene.

5. The multi-layer composite water pipe according to claim 1, wherein said first connecting end and said second connecting end each have a circular cross section, said first connecting end and said second connecting end respectively define a water inlet channel and a water outlet channel along a central axis, wherein a diameter of said water inlet channel is not smaller than a diameter of said water outlet channel.

6. The multi-layer composite water pipe according to claim 5, wherein said first connecting end is connected to an external water supply device, and at least one chute is provided on said first connecting end, and a buckle is provided inside said at least one chute.

7. The multi-layer composite water pipe according to claim 6, wherein an outer side of said first connecting end is provided with a first fastener, and at least one sliding block is provided on an inner wall surface of said first fastener; and said at least one sliding block is slidable longitudinally along said at least one chute and pushes said buckle to be in a buckled or relaxed state.

8. The multi-layer composite water pipe according to claim 7, wherein said adapter further comprises an annular boss, an upper end of said annular boss comprises at least one fixing buckle, and a lower end part of said first connecting end communicates with said annular boss and is fixedly connected through said at least one fixing buckle; and said annular boss further comprises a fluid delivery channel having approximately a same diameter as said water inlet channel.

9. The multi-layer composite water pipe according to claim 8, wherein said annular boss further comprises a receiving end, and said receiving end receives and limits a longitudinal sliding distance of said first fastener.

10. The multi-layer composite water pipe according to claim 9, wherein a lower end of said annular boss is provided with a connecting part, said connecting part is provided with a water flow channel inside, and said water flow channel has approximately a same diameter as said water outlet channel; and said water flow channel communicates said fluid delivery channel with said water outlet channel, and a second external thread is further provided on said connecting part.

11. The multi-layer composite water pipe according to claim 10, wherein a fastening device is provided at a joint of said input end and said adapter; and said fastening device comprises a fixture, and a fastener fitted on said fixture; and said fixture and said fastener each have a cylindrical structure varying in axial diameter; and wherein a diameter of said fixture is not less than a diameter of said pipe body.

12. The multi-layer composite water pipe according to claim 11, wherein said fixture comprises a fixing part comprising a plurality of clips, wherein protrusions are provided on inner sides of said plurality of clips with gaps between adjacent clips of said plurality of clips.

13. The multi-layer composite water pipe according to claim 12, wherein at least a part of an inner side of said fastener is provided with a second internal thread, and said second external thread is in mating connection with said second internal thread.

14. A multi-layer composite water pipe, comprising a pipe body, wherein said pipe body is made of a plastic material; and said pipe body has equally spaced extensible corrugations defining that said pipe body comprises at least one compressed configuration and at least one extended configuration; and said pipe body is variable in length between said at least one compressed configuration and said at least one extended configuration;

wherein an outer side of said pipe body is provided with a first tubular element made of an elastic material;

wherein an outer side of said first tubular element is provided with an extensible braided layer, said braided layer is made of a fabric material, and said braided layer comprises at least two braided cord sets; and said at least two braided cord sets comprise at least two braided cords, said braided cords are distributed in parallel, and said at least two braided cord sets are cross-wound on said first tubular element to form a continuous diamond-shaped mesh structure;

wherein an outer side of said braided layer is provided with a second tubular element made of an elastic material, and said first tubular element, said braided layer and said second tubular element are all extendable or compressible in a direction of a change in length of said pipe body;

wherein said pipe body comprises an input end and an output end, said input end has an adapter detachably connected thereto, said adapter has a sealing sleeve thereon, and said input end forms a detachable connection with said adapter through said sealing sleeve;

wherein said pipe body has a change in length between said at least one compressed configuration and said at least one extended configuration of 1.2-5 times said pipe body; and wherein said sealing sleeve has an end having a taper, and said sealing sleeve has an opening along the taper.

15. The multi-layer composite water pipe according to claim 14, wherein said sealing sleeve is made of a rubber material.

* * * * *